US012672664B2

(12) United States Patent
Yuasa et al.

(10) Patent No.: US 12,672,664 B2
(45) Date of Patent: Jul. 7, 2026

(54) WRAP OFF-CUTS CUTTING AND RETURNING APPARATUS IN GYOZA FORMING MACHINE

(71) Applicant: Tosei Kogyo Co., Ltd., Tokyo (JP)

(72) Inventors: Toyono Yuasa, Tokyo (JP); Yoshie Yuasa, Tokyo (JP); Masahito Murakami, Tokyo (JP)

(73) Assignee: Tosei Kogyo Co., Ltd., Tokyo (JP)

( * ) Notice: Subject to any disclaimer, the term of this patent is extended or adjusted under 35 U.S.C. 154(b) by 1031 days.

(21) Appl. No.: 17/861,797

(22) Filed: Jul. 11, 2022

(65) Prior Publication Data

US 2023/0200428 A1 Jun. 29, 2023

(30) Foreign Application Priority Data

Dec. 27, 2021 (JP) ................................. 2021-212897

(51) Int. Cl.
*A23P 20/25* (2016.01)
*A21C 9/06* (2006.01)

(52) U.S. Cl.
CPC .............. *A23P 20/25* (2016.08); *A21C 9/066* (2013.01)

(58) Field of Classification Search
CPC ......... A21C 11/10; A21C 11/12; A21C 3/025; A21C 9/063; A21C 9/066; A23P 20/25
USPC ....................................................... 99/450.6
See application file for complete search history.

(56) References Cited

FOREIGN PATENT DOCUMENTS

| CN | 101039580 A | | 9/2007 |
|----|-------------|---|--------|
| CN | 203801581 | * | 9/2014 |
| CN | 203801581 U | | 9/2014 |
| CN | 104472608 | * | 4/2015 |
| CN | 104472608 A | | 4/2015 |
| JP | H11289963 | * | 2/2000 |
| JP | 2002209506 A | | 7/2002 |
| JP | 2019165699 | * | 10/2019 |
| JP | 6727566 B2 | | 7/2020 |

OTHER PUBLICATIONS

Chinese First Office Action cited in corresponding Chinese Patent Application No. 202210954933.9 issued on Mar. 19, 2025.

* cited by examiner

*Primary Examiner* — Ibrahime A Abraham
*Assistant Examiner* — Joseph W Iskra
(74) *Attorney, Agent, or Firm* — BACON & THOMAS, PLLC

(57) ABSTRACT

In a gyoza forming machine compressing a half kneaded noodle skin raw material to form into a belt-like shape, die cutting the obtained belt-like material into a predetermined shape to form a gyoza skin, and wrapping the gyoza filling with the gyoza skin to obtain a gyoza, a wrap off-cuts cutting and returning apparatus is provided with a cutting unit which sequentially cuts the belt-like wrap off-cuts after being die cut into a wrap off-cuts piece having a predetermined length via a feeding unit thereof, a supply unit for the wrap off-cuts and a half kneaded noodle skin raw material wrap off-cuts to which the wrap off-cuts piece cut by the cutting unit is continuously supplied while dropping, and a noodle belt forming unit which compresses the wrap off-cuts piece and the noodle skin raw material mixed within the supply unit to form a one-layer structure new noodle belt.

8 Claims, 14 Drawing Sheets

WRAP OFF-CUTS CUTTING AND RETURNING APPARATUS IN GYOZA FORMING MACHINE

TECHNICAL FIELD

The present invention relates to a wrap off-cuts cutting and returning apparatus in a gyoza forming machine, and more particularly to a wrap off-cuts cutting and returning apparatus in a gyoza forming machine for reusing a belt-like wrap off-cuts after die cutting a belt-like noodle skin for a gyoza skin.

BACKGROUND ART

In the past, as disclosed in patent literature 1, there exists a gyoza making apparatus including an input unit which can input a half kneaded material, a belt-like forming unit which compresses the half kneaded material input to the input unit and forms into a belt-like shape, a die cutting unit which can die cut the belt-like material obtained in the belt-like forming unit into a predetermined shape and obtain a gyoza skin, a gyoza forming unit which puts a gyoza filling on the gyoza skin obtained in the die cutting unit and obtains a gyoza by wrapping the gyoza filling with the gyoza skin, and a carry-in unit which carries the wrap off-cuts after die cut by the die cutting unit in the belt-like forming unit.

The belt-like forming unit of the patent literature 1 is configured to be capable of forming a belt-like material having a first layer which is formed in one surface side and is formed by the half kneaded material input to the input unit, and a second layer which is formed in the other surface side and is formed by the remaining material carried in the belt-like forming unit by the carry-in unit.

CITATION LIST

Patent Literature

Patent Literature 1: Japanese Patent No. 6727566

SUMMARY OF INVENTION

Technical Problem

However, in the patent literature 1, a production cost can be reduced by reusing the remaining material, but the second layer formed by the remaining material is inside the skin on which the gyoza filling is put. As a result, the second layer is less flexible in comparison with the skin of the first layer, and there is a risk that the texture will deteriorate. More specifically, since moisture of the reused remaining material is different from moisture of the newly input half kneaded material, the portion obtained by the remaining material is different in hardness from the portion obtained by the half kneaded new material in a case where the remaining material die cut by the die cutting unit is reused as the gyoza skin. As a result, the quality varies and there is a problem that the texture and taste deteriorate.

The present invention is made by taking into consideration the conventionally existing circumstances as mentioned above, and an object of the present invention is to provide a wrap off-cuts cutting and returning apparatus in a gyoza forming machine which can reduce a production cost by reusing a remaining material (wrap off-cuts) after being die cut, and can obtain a one-layer structure gyoza skin which can suppress deterioration of texture and taste due to the remaining material and maintain a quality with no variation.

Solution to Problem

In order to achieve the object mentioned above, according to the present invention, there is provided a wrap off-cuts cutting and returning apparatus in a gyoza forming machine compressing a half kneaded noodle skin raw material to form into a belt-like shape, die cutting the obtained belt-like material into a predetermined shape to form a gyoza skin, putting a gyoza filling on the gyoza skin, and wrapping the gyoza filling with the gyoza skin to obtain a gyoza, wherein the wrap off-cuts cutting and returning apparatus comprises a cutting unit which sequentially cuts a belt-like wrap off-cuts after being die cut into a wrap off-cuts piece having a predetermined length via a feeding unit thereof, a supply unit for the half kneaded noodle skin raw material to which the wrap off-cuts piece cut by the cutting unit is continuously supplied while dropping, and a noodle belt forming unit which compresses the wrap off-cuts piece and the noodle skin raw material mixed within the supply unit to form a one-layer structure new noodle belt, and wherein the gyoza forming machine is configured to return the wrap off-cuts piece obtained by cutting the die cut belt-like wrap off-cuts of the new noodle belt formed by the noodle belt forming unit by the cutting unit to the supply unit for the half kneaded noodle skin raw material.

The cutting unit for the belt-like wrap off-cuts includes a pair of rotary blade and rotating roller which are arranged in an opposing manner so as to cut across the vertically dropping belt-like wrap off-cuts at intervals in a vertical direction while holding the vertically dropping belt-like wrap off-cuts from both surfaces.

The rotary blade includes a plurality of plate blades which are provided in a protruding manner at uniform intervals on an outer periphery of a rotating shaft and are slightly longer than a horizontal width of the belt-like wrap off-cuts.

A scraper is arranged below the rotary blade and the rotating roller, the scraper scraping off noodle dregs which are attached to a leading end a plate blade in the rotary blade and an outer periphery surface of the rotating roller.

The cutting unit for the belt-like wrap off-cuts is formed by a flat blade and a backing plate which move forward and backward in a horizontal direction so as to cut across the vertically dropping belt-like wrap off-cuts at intervals in a vertical direction while holding the vertically dropping belt-like wrap off-cuts from both surfaces.

The supply unit includes a hopper which is arranged below the cutting unit and to which the half kneaded noodle skin raw material and the wrap off-cuts piece cut by the cutting unit are supplied while dropping, and a feeding conveyor which feeds the noodle skin raw material and the wrap off-cuts piece to the noodle belt forming unit while mixing and is disposed in a lower side of the hopper.

An agitating mechanism is provided in an inner portion of the hopper, the agitating mechanism mixing while agitating the half kneaded noodle skin raw material and the wrap off-cuts piece fed by the feeding conveyor.

The noodle belt forming unit includes a rolling machine fixed to a shaft in which a rotating disc axially supporting a plurality of beat rollers so as to be rotatable on the same circumference is pivotally supported below a support frame, and the half kneaded noodle skin raw material and the wrap off-cuts piece mixed within the supply unit are rolled between the noodle belt forming unit and an upper portion of the driving roller at the front of the feeding conveyor below the supply unit, so that one-layer new noodle belt is formed.

The needle belt forming unit includes a rolling machine fixed to a shaft in which a pipe roller is pivotally supported below a support frame rotatably, and the half kneaded noodle skin raw material and the wrap off-cuts piece mixed within the supply unit are rolled between the noodle belt forming unit and an upper portion of the driving roller at the front of the feeding conveyor below the supply unit, so that one-layer new noodle belt is formed.

The feeding unit includes a driving roller which is arranged at a front position, a driven roller which is arranged at a rear position, an endless conveyor belt which is wound between both the rollers, a support plate which is arranged along a lower surface of an upper horizontal portion of the conveyor belt, and a pressing roller and a lifting roller which bring the upper horizontal portion and a lower horizontal portion of the conveyor belt into contact with or close contact with both upper and lower surfaces of the support plate near a rear side of the conveyor belt.

A plurality of die cutting holes for the gyoza skin are open to the endless conveyor belt at uniform intervals.

Through holes for the gyoza skin having the same shape and the same size as those of the die cutting holes in the conveyor belt are open to the support plate in the die cutting unit at the rear of the support plate.

A plurality of locking projections are provided in a protruding manner at uniform intervals on outer peripheries of both ends of the driving roller, and a plurality of locking holes locked to the locking projections are pierced at uniform intervals in both sides of the endless conveyor belt, so that the conveyor belt is rotated in the same direction according to rotation of the driving roller.

The die cutting unit includes a cover which is covered from the above in the vicinity of a rear side of the feeding unit and is open in a lower end thereof, a base plate which is fixed to an approximately center portion in the cover, and a punching die which is arranged below the base plate so as to be movable up and down.

The punching die is configured to transfer the belt-like wrap off-cuts to a front side of the feeding unit, the belt-like wrap off-cuts on which a plurality of punching holes are formed at uniform intervals, the plurality of punching holes being obtained by die cutting the new noodle belt mounted on the upper surface of the conveyor belt while sequentially inserting to and extracting from the through holes in the support plate of the feeding unit and the die cutting holes passing through both the upper and lower surfaces of the conveyor belt in the cover.

The punching die is configured to transfer the gyoza skin to the gyoza forming machine waiting below the die cutting unit, the gyoza skin being obtained by die cutting the new noodle belt mounted on the upper surface of the conveyor belt while sequentially inserting to and extracting from the through holes in the support plate of the feeding unit and the die cutting holes passing through both the upper and lower surfaces of the conveyor belt in the cover.

Effect of Invention

A description will be given below of an effect of the present invention.

According to the first aspect of the present invention, in the gyoza forming machine compressing the half kneaded noodle skin raw material to form into the belt-like shape, die cutting the obtained belt-like material into the predetermined shape to form the gyoza skin, putting the gyoza filling on the gyoza skin, and wrapping the gyoza filling with the gyoza skin to obtain the gyoza, the gyoza forming machine comprises the cutting unit which sequentially cuts the belt-like wrap off-cuts after being die cut into the wrap off-cuts piece having the predetermined length via the feeding unit thereof, the supply unit for the half kneaded noodle skin raw material to which the wrap off-cuts piece cut by the cutting unit is continuously supplied while dropping, and the noodle belt forming unit which compresses the wrap off-cuts piece and the noodle skin raw material mixed within the supply unit to form the one-layer structure new noodle belt, and the gyoza forming machine is configured to return the wrap off-cuts piece obtained by cutting the die cut belt-like wrap off-cuts of the new noodle belt formed by the noodle belt forming unit by the cutting unit to the supply unit for the half kneaded noodle skin raw material. Therefore, the production cost can be reduced by reusing the wrap off-cuts corresponding to the remaining material, and the reduction in the texture and the taste caused by the difference in hardness between both surfaces of the two-layer structure gyoza skin can be improved by employing the one-layer structure formed by the new noodle belt.

According to the second aspect, the cutting unit for the belt-like wrap off-cuts includes the pair of rotary blade and rotating roller which are arranged in the opposing manner so as to cut across the vertically dropping belt-like wrap off-cuts at intervals in the vertical direction while holding the vertically dropping belt-like wrap off-cuts from both surfaces. Therefore, the belt-like wrap off-cuts after being die cut can be continuously cut, and a lot of wrap off-cuts pieces can be efficiently obtained.

According to the third aspect, the rotary blade includes the plurality of plate blades which are provided in the protruding manner at uniform intervals on the outer periphery of the rotating shaft and are slightly longer than the horizontal width of the belt-like wrap off-cuts. Therefore, the belt-like wrap off cuts after being die cut can be securely cut without being failed to be cut.

According to the fourth aspect, the scraper is arranged below the rotary blade and the rotating roller, the scraper scraping off the noodle dregs which are attached to the leading end of the plate blade in the rotary blade and the outer periphery surface of the rotating roller. Therefore, the left-over material and the trouble in the cutting work due to the motion of the rotary blade and the rotating roller can be avoided, and the scraped-off noodle dregs can be supplied while dropping into the hopper without being wasted.

According to the fifth aspect, the cutting unit for the belt-like wrap off-cuts is formed by the flat blade and the backing plate which move forward and backward in the horizontal direction so as to cut across the vertically dropping belt-like wrap off-cuts at intervals in the vertical direction while holding the vertically dropping belt-like wrap off-cuts from both surfaces. Therefore, the belt-like wrap off-cuts after being die cut can be continuously cut, and a lot of wrap off-cuts pieces can be efficiently obtained.

According to the sixth aspect, the supply unit includes the hopper which is arranged below the cutting unit and to which the half kneaded noodle skin raw material and the wrap off-cuts piece cut by the cutting unit are supplied while dropping, and the feeding conveyor which feeds the noodle skin raw material and the wrap off-cuts piece to the noodle belt forming unit while mixing and is disposed in the lower side of the hopper. Therefore, the half-kneaded noodle skin raw material and the wrap off-cuts piece can be smoothly and securely transferred and fed to the noodle belt forming unit.

According to the seventh aspect, the agitating mechanism is provided in the inner portion of the hopper, the agitating mechanism mixing while agitating the half kneaded noodle skin raw material and the wrap off-cuts piece fed by the feeding conveyor. Therefore, the half kneaded noodle belt raw material and the wrap off-cuts piece can be more securely mixed within the hopper.

According to the eighth aspect, the noodle belt forming unit includes the rolling machine fixed to the shaft in which the rotating disc axially supporting the plurality of beat rollers so as to be rotatable on the same circumference is pivotally supported below the support frame, and the half kneaded noodle skin raw material and the wrap off-cuts piece mixed within the supply unit are rolled between the noodle belt forming unit and the upper portion of the driving roller at the front of the feeding conveyor below the supply unit, so that one-layer new noodle belt is formed. Therefore, it is possible to easily form the new noodle belt having the one-layer structure in a short time on the basis of the beating motion of the plurality of beat rollers.

According to the ninth aspect, the needle belt forming unit includes the rolling machine fixed to the shaft in which the pipe roller is pivotally supported below the support frame rotatably, and the half kneaded noodle skin raw material and the wrap off-cuts piece mixed within the supply unit are rolled between the noodle belt forming unit and the upper portion of the driving roller at the front of the feeding conveyor below the supply unit, so that the one-layer new noodle belt is formed. Therefore, it is possible to easily form the new noodle belt having the one-layer structure in a short time on the basis of the rolling motion of the pipe roller.

According to the tenth aspect, the feeding unit includes the driving roller which is arranged at the front position, the driven roller which is arranged at the rear position, the endless conveyor belt which is wound between both the rollers, the support plate which is arranged along the lower surface of the upper horizontal portion of the conveyor belt, and the pressing roller and the lifting roller which bring the upper horizontal portion and the lower horizontal portion of the conveyor belt into contact with or close contact with both upper and lower surfaces of the support plate near the rear side of the conveyor belt. Therefore, the belt-like wrap off-cuts after being die cut can be suspended from the driving roller leading end while being smoothly transferred forward, and can be securely fed to the cutting unit which is positioned below.

According to the eleventh aspect, the plurality of die cutting holes for the gyoza skin are open to the endless conveyor belt at uniform intervals.

Therefore, the new noodle belt mounted on the conveyor belt can be preferably die cut into the gyoza skin intermittently.

According to the twelfth aspect, the through holes for the gyoza skin having the same shape and the same size as those of the die cutting holes in the conveyor belt are open to the support plate in the die cutting unit at the rear of the support plate. Therefore, the conveyor belt can be stabilized in a horizontal state, and the new noodle belt can be securely die cut by the die cutting hole of the conveyor belt without being troubled.

According to the thirteenth aspect, the plurality of locking projections are provided in the protruding manner at uniform intervals on the outer peripheries of both ends of the driving roller, and the plurality of locking holes locked to the locking projections are pierced at uniform intervals in both sides of the endless conveyor belt, so that the conveyor belt is rotated in the same direction according to rotation of the driving roller. Therefore, the rotation of the conveyor belt can be smoothly and securely performed.

According to the fourteenth aspect, the die cutting unit includes the cover which is covered from the above in the vicinity of the rear side of the feeding unit and is open in the lower end thereof, the base plate which is fixed to the approximately center portion in the cover, and the punching die which is arranged below the base plate so as to be movable up and down. Therefore, the new noodle belt can be securely and easily die cut into the gyoza skin with a simple mechanism.

According to the fifteenth aspect, the punching die is configured to transfer the belt-like wrap off-cuts to the front side of the feeding unit, the belt-like wrap off-cuts on which the plurality of punching holes are formed at uniform intervals, the plurality of punching holes being obtained by die cutting the new noodle belt mounted on the upper surface of the conveyor belt while sequentially inserting to and extracting from the through holes in the support plate of the feeding unit and the die cutting holes passing through both the upper and lower surfaces of the conveyor belt in the cover. Therefore, the punching die can smoothly move without troubling the punching operation caused by the ascending and descending motion of the punching die in the same manner as mentioned above, and the belt-like wrap off-cuts after being die cut can be easily transferred to the front side of the feeding unit.

According to the sixteenth aspect, the punching die is configured to transfer the gyoza skin to the gyoza forming machine waiting below the die cutting unit, the gyoza skin being obtained by die cutting the new noodle belt mounted on the upper surface of the conveyor belt while sequentially inserting to and extracting from the through holes in the support plate of the feeding unit and the die cutting holes passing through both the upper and lower surfaces of the conveyor belt in the cover. Therefore, both the upper and lower surfaces overlapped into three layers are consistent with each of the holes in the support plate. Thus, the punching die can be smoothly moved without troubling the punching operation caused by the ascending and descending motion of the punching die, and the gyoza skin can be easily transferred to the gyoza forming machine.

BRIEF DESCRIPTION OF DRAWINGS

FIGS. 7A, 7B and 7C show the other embodiment of the cutting unit of the belt-like wrap off-cuts after being die cut in the gyoza forming machine, in which FIG. 7A is an explanatory view before cutting the belt-like wrap off-cuts, FIG. 7B is an explanatory view when cutting the belt-like wrap off-cuts, and FIG. 7C is a plan view of the cutting unit of the belt-like wrap off-cuts.

FIGS. 14A and 14B show a die cutting machine in the gyoza forming machine, in which FIG. 14A is a cross sectional view before die cutting, and FIG. 14B is a cross sectional view after die cutting.

FIGS. 15A, 15B and 15C are cross sectional views of a forming die for forming a gyoza from a gyoza skin which is die cut by the die cutting machine, in which FIG. 15A shows an open state of the forming die on which the gyoza skin and a filling are put, FIG. 15B shows a closed state of the forming die, and FIG. 15C shows a state in which the formed gyoza is pushed out from the forming die.

DESCRIPTION OF EMBODIMENTS

A description will be in detail given below of an embodiment of a wrap off-cuts cutting and returning apparatus in a gyoza forming machine according to the present invention with reference to the accompanying drawings.

Figure 1:
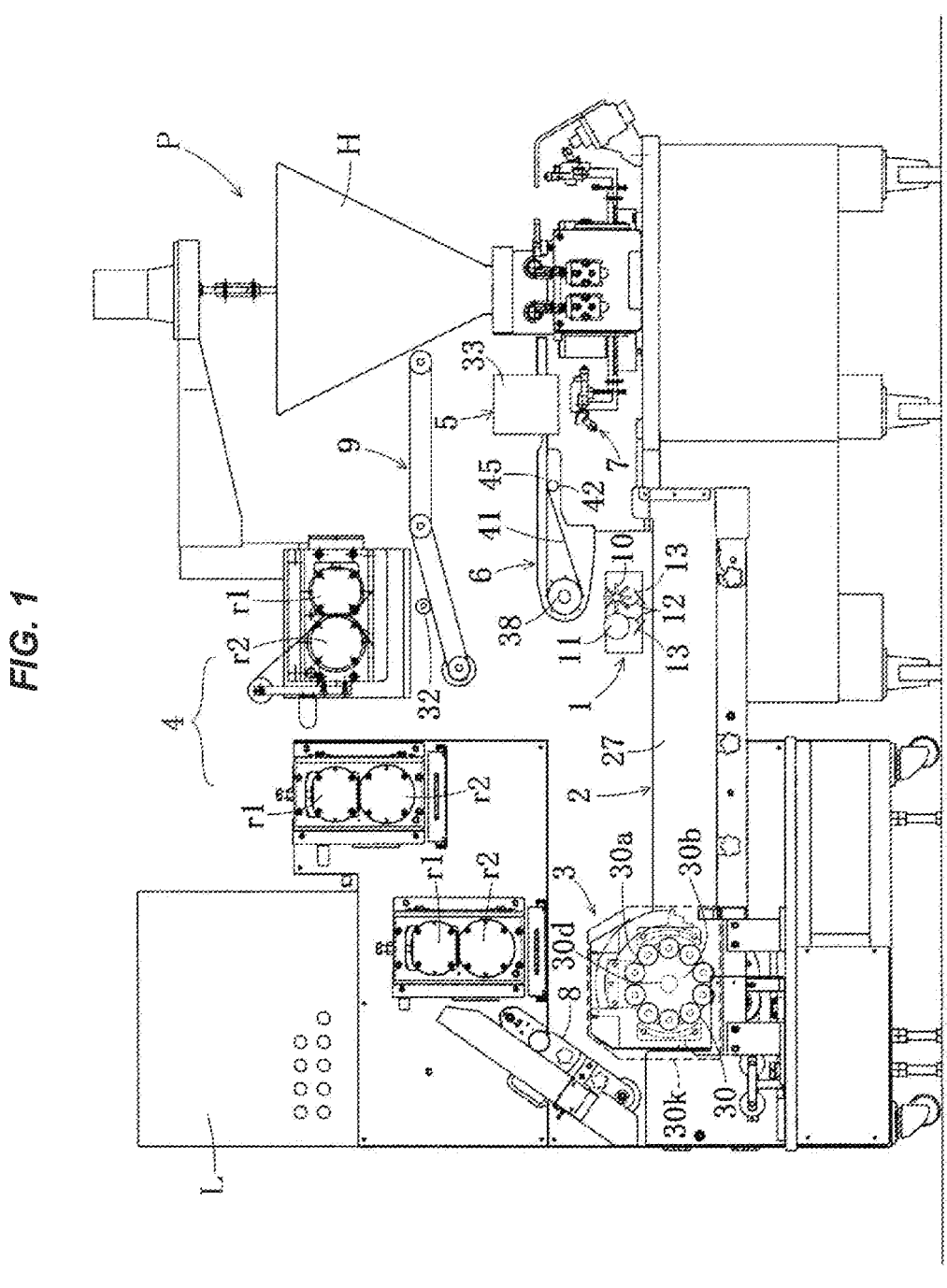
FIG. 1 is a front elevational view of a gyoza forming machine and shows an embodiment for carrying out the present invention.
Figure 2:
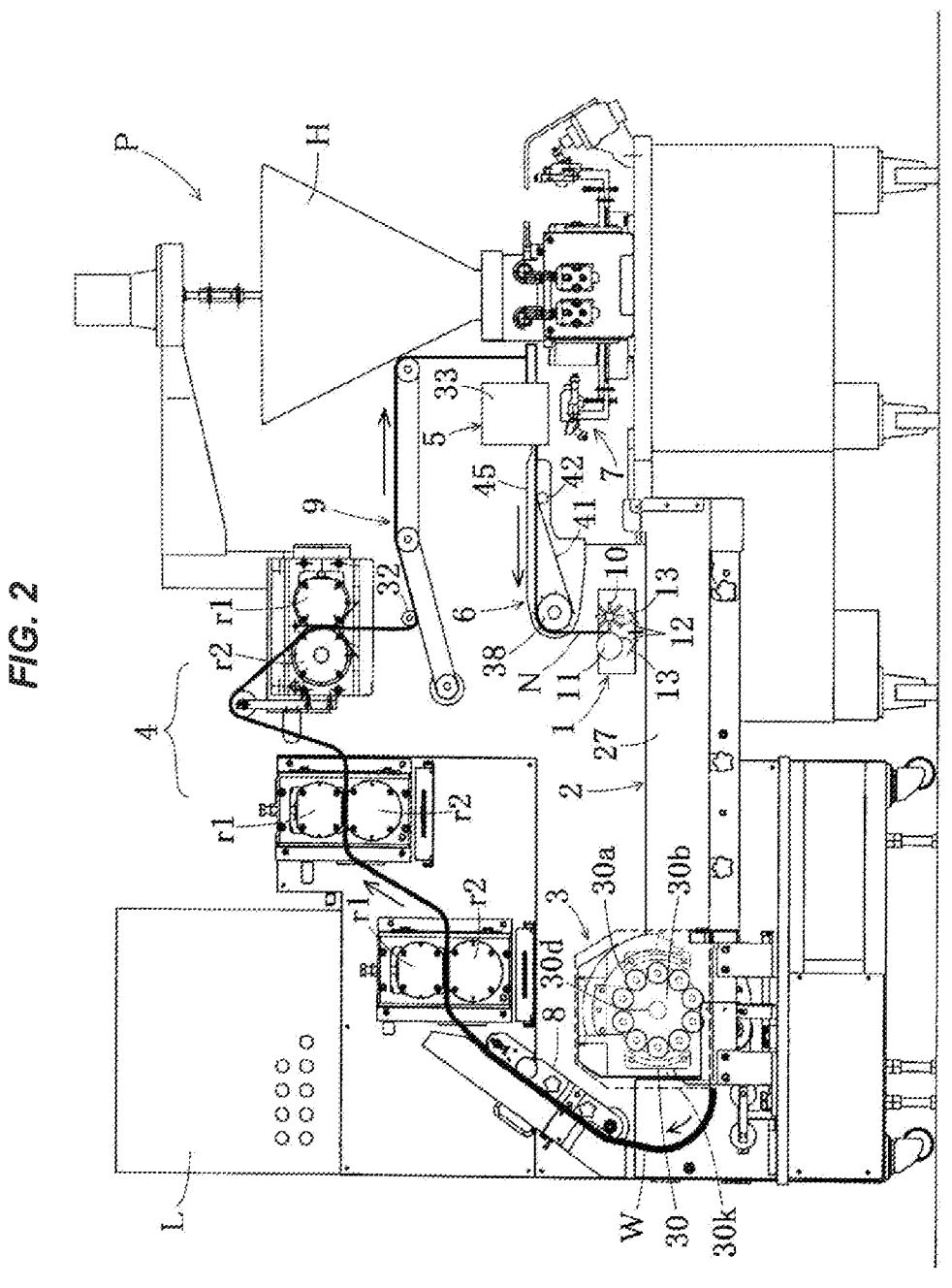
FIG. 2 is a front elevational view showing in detail a feeding route of a gyoza skin including a wrap off-cuts of the gyoza forming machine.
Figure 3:
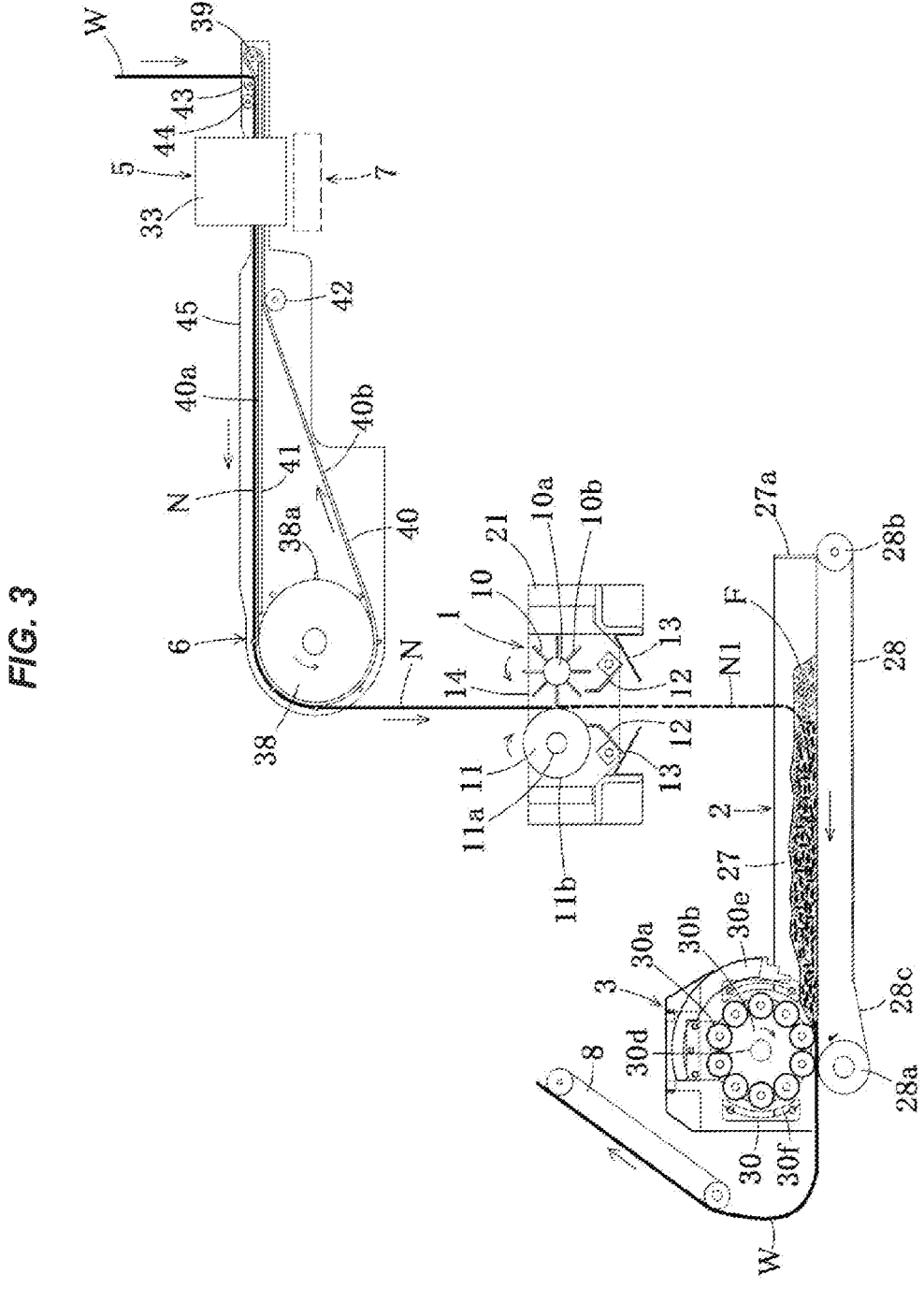
FIG. 3 is an explanatory view showing a used state of each of the feeding unit of a belt-like wrap off-cuts after being die cut in the gyoza forming machine, a cutting unit, a mixing and supply unit of a wrap off-cuts piece and a half kneaded noodle skin raw material, and a noodle belt forming unit.

First of all, a description will be comprehensively given of a gyoza forming machine P according to the present embodiment. As shown in FIGS. 1, 2 and 3, the gyoza forming machine P is configured to form a new noodle belt W having a one-layer structure by compressing a half kneaded noodle skin raw material F formed by mixing water with a flour and kneading them and a wrap off-cuts piece N1 obtained by cutting a belt-like wrap off-cuts N (using a new noodle belt mentioned below as a material) after mixing, put a filling g on a gyoza skin M obtained by die cutting the new noodle belt W into a predetermined shape, and thereafter form a gyoza G by wrapping the filling g with the gyoza skin M.

In particular, a wrap off-cuts cutting and returning apparatus in the gyoza forming machine according to the present invention is provided as major parts with a cutting unit 1 which continuously cuts the belt-like wrap off-cuts N after die cutting the new noodle belt W into a predetermined length, a supply unit 2 for the half kneaded noodle skin raw material F to which the wrap off-cuts piece N1 obtained by cutting the new noodle belt W by the cutting unit 1 is supplied one after the other while dropping, a noodle belt forming unit 3 which compresses the wrap off-cuts piece N1 and the half kneaded noodle skin raw material F mixed within the supply unit 2 to form the new noodle belt W having the one-layer structure, a rolling unit 4 which transfers the new noodle belt W formed by the noodle belt forming unit 3 by a feeding conveyor 8 and rolls the new noodle belt W, a die cutting unit 5 which transfers the new noodle belt W after being rolled by a feeding conveyor 9 and die cuts the new noodle belt W into a gyoza skin M, a feeding unit 6 which introduces the belt-like wrap off-cuts N after being die cut to the cutting unit 1, and a gyoza forming machine 7.

Describing in more detail, the cutting unit 1 is structured, as shown in FIGS. 1, 2, 3 and 6, such that a rotary blade 10 and a rotating roller 11 are arranged in an opposite manner in a state in which they are loosely in contact with each other front, back, left and right, scrapers 12 and 12 having the approximately shape of the kanji for eight are arranged below the rotary blade 10 and the rotating roller 11 so as to come into contact with the outer peripheral surfaces of the rotary blade 10 and the rotating roller 11, and covers 13 and 13 having the inverse shape of the kanji for eight are arranged below the same, respectively.

The scrapers 12 and 12 are provided for scraping off noodle dregs attached to a leading end (a plurality of plate blade leading ends mentioned later) of the rotary blade 10 and an outer peripheral surface of the rotating roller 11, when cutting the belt-like wrap off-cuts N dropped from the leading end portion of the feeding unit 6 into a wrap off-cuts piece N1 having a predetermined length between the rotary blade 10 and the rotating roller 11 in the cutting unit 1.

In the meantime, the covers 13 and 13 act as a guide for supplying the wrap off-cuts piece N1 together with the noodle dregs scraped off by the scrapers 12 and 12 into the below supply unit 2 from a lower end gap in addition to the role of covering the cutting unit 1.

In the cutting unit 1, the rotary blade 10 is formed by a metal material, and is circumferentially provided with base portions of a plurality of (eight in the illustrated embodiment) plate blades 10b on an outer periphery of a columnar rotating shaft 10a at uniform intervals.

In the meantime, in the cutting unit 1, the rotating roller 11 is formed by a metal material, and a pipe roller 11b is firmly attached to an outer periphery of a columnar rotating shaft 11a. The pipe roller 11b may employ a hard elastic material, for example, a hard rubber in place of the metal material.

Figure 6:
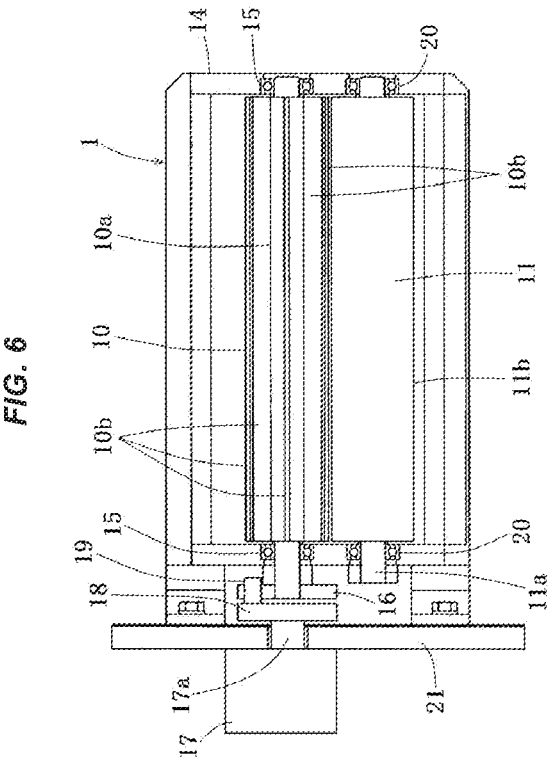
FIG. 6 is an enlarged plan view of the cutting unit of the belt-like wrap off-cuts after being die cut in the gyoza forming machine.

The rotary blade 10 is structured, as shown in FIG. 6, such that both ends of the rotating shaft 10a are axially supported to both ends of an approximately rectangular frame 14 so as to be rotatable via a bearing 15, and one end of the rotating shaft 10a is formed to be extended, and rotates in conjunction with a locking shaft 19 of a rotating plate 18 which is firmly attached to a drive shaft 17a of a drive unit 17 such as a motor via a coupling 16 in the extended portion. The rotating means of the rotary blade 10 is not limited to the part mentioned above, but may utilize, for example, a gear and a chain. Further, the rotating shaft 10a may be directly connected to the drive shaft 17a of the drive unit 17 such as the motor to be interlocked.

The rotating roller 11 is structured such that both ends of the rotating shaft 11a are axially supported to both ends of the rectangular frame 14 so as to be freely rotatable via a bearing 20. Further, each of the rectangular frame 14 and the drive unit 17 such as the motor is attached to an attachment plate 21.

The rotating roller 11 is set such as to be freely rotatable via the bearing 20, however, may be rotatably driven in a direction of an arrow (an opposite direction to the rotary blade 10) as shown in FIG. 3 via a drive source (not shown).

Further, in the cutting unit 1, horizontal widths (lengths in an axial direction) of the plate blade 10b of the rotary blade 10 and the rotating roller 11 are set to be slightly longer than that of the belt-like wrap off-cuts N corresponding to an object to be cut. Thus, the belt-like wrap off-cuts N is cut off one by one without being wasted since the leading end of the plate blade 10b of the rotary blade 10 intermittently comes into contact with the outer peripheral surface of the rotating roller 11.

Next, a description will be given of the other embodiment of the cutting unit 1.

The cutting unit 1 according to the present embodiment mentioned above is formed by combination of the rotary blade 10 having a plurality of plate blades 10b and one rotating roller 11. However, the cutting unit 1 according to the other embodiment is formed by combination of a knife and a cutting board, as shown in FIGS. 7A to 7C.

More specifically, a backing plate 22 is arranged in a back face of the belt-like wrap off-cuts N falling down vertically from the leading end of the feeding unit 6 of the belt-like wrap off-cuts N, and one flat blade 24 is arranged in an opposing manner at a predetermined interval, the flat blade 24 being horizontally fixed to a shaft portion 23a which extends and contracts in a longitudinal direction by a drive unit 23 such as a cylinder transversely provided in a front face side of the backing plate 22.

In the drawing, reference numeral 25 denotes a base plate, and reference numeral 26 denotes a retention band fixing the drive unit 23 to the base plate 25, respectively. The horizontal flat blade 24 may be constructed by a plurality of horizontal flat blades which are provided at predetermined intervals in a vertical direction.

Figure 7:
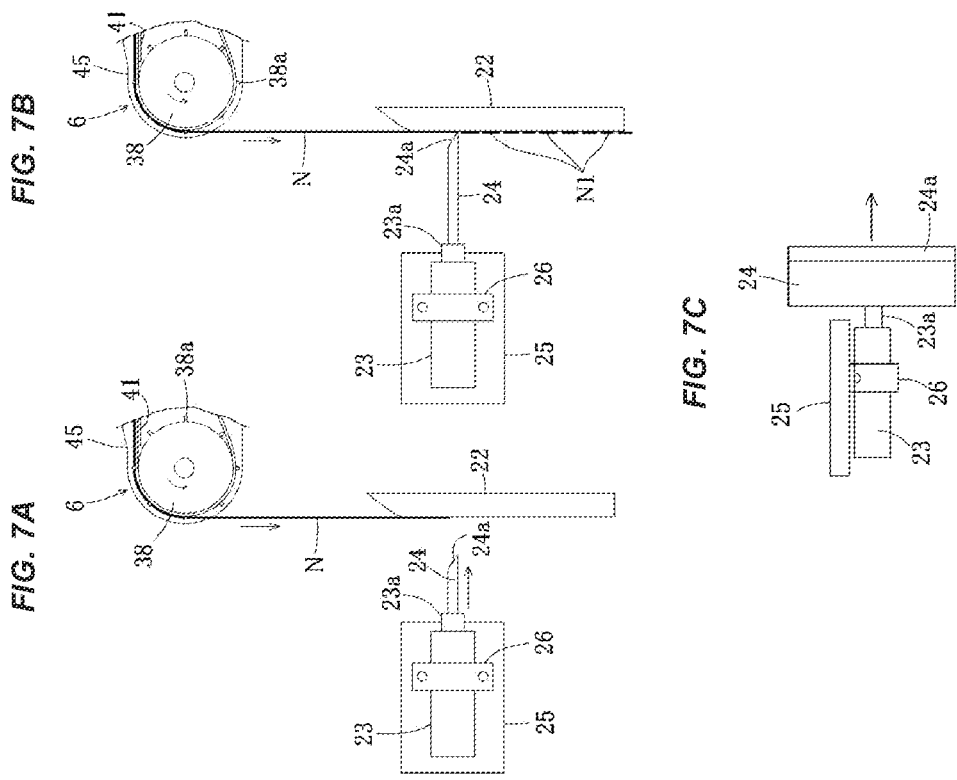

FIG. 7A shows a state in which the shaft portion 23a of the drive unit 23 is contracted, and the flat blade 24 fixed to the shaft portion 23a is separated from the backing plate 22. At this time, the belt-like wrap off-cuts N fed from the feeding unit 6 is positioned in a front face of the backing plate 22, however, does not fall down to an opposing position of the flat blade 24.

Next, FIG. 7B shows a state in which the shaft portion 23a of the drive unit 23 is extended, and the flat blade 24 fixed to the shaft portion 23a comes into contact with the backing plate 22. At this time, the belt-like wrap off-cuts N fed from the feeding unit 6 falls down while coming into slidable contact with the front face of the backing plate 22, so that the belt-like wrap off-cuts N is cut one by one into the wrap off-cuts piece N1 having a predetermined length by a cutting edge 24a in the leading end of the flat blade 24.

Further, the flat blade 24 intermittently cuts the belt-like wrap off-cuts N in the process of falling down along the front face of the backing plate 22 on the basis of the repeated extension and contraction of the shaft portion 23a of the drive unit 23. The wrap off-cuts piece N1 cut as mentioned above is continuously supplied into the below supply unit 2 while dropping.

Figure 8:
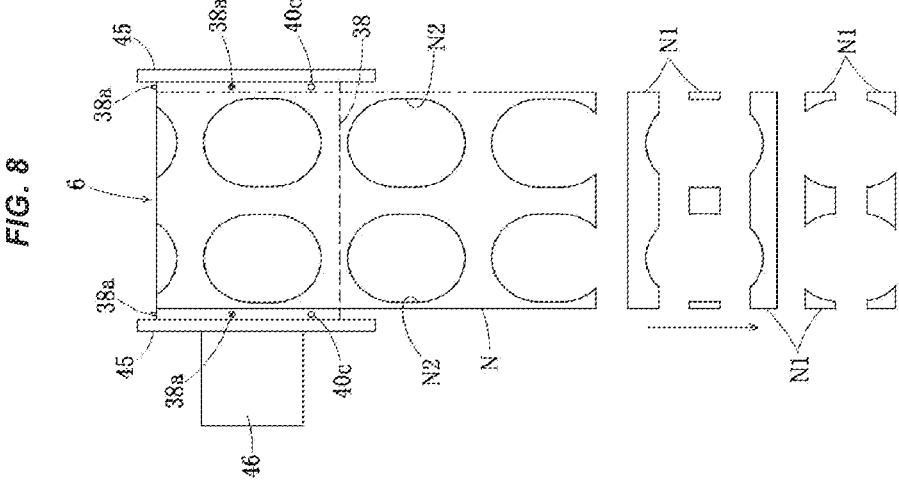
FIG. 8 is an explanatory view showing a state in which the wrap off-cuts is cut by the cutting unit.

FIG. 8 shows a disconnected state of the belt-like wrap off-cuts N which is fed downward from the feeding unit 6. Since a plurality of punching holes N2 after pulling out the gyoza skin M are formed in the belt-like wrap off-cuts N, the wrap off-cuts piece N1 after being disconnected is dispersed into various great and small sizes and shapes and is supplied one by one into the supply unit 2.

Further, the supply unit 2 is configured to be arranged below the cutting unit 1, as shown in FIGS. 1, 2 and 3, and is provided with a hopper 27 to which the half kneaded noodle skin raw material F and the wrap off-cuts piece N1 after cutting the belt-like wrap off-cuts N, and a feeding conveyor 28 which feeds the noodle skin raw material F and the wrap off-cuts piece N1 in a lower side within the hopper 27 to the noodle belt forming unit 3 in the next step. Further, the feeding conveyor 28 is constructed by a driving roller 28a in a front side, a driven roller 28b in a rear side, and a conveyor belt 28c which is wound between both the rollers 28a and 28b.

Describing in detail, the supply unit 2 is formed in such a manner that the wrap off-cuts piece N1 cut by the cutting unit 1 is continuously let down and input to the upper side of the noodle skin raw material F after supplying the half kneaded noodle skin raw material F to the upper surface of the feeding conveyor 28 in the rear side within the hopper 27.

The wrap off-cuts piece N1 supplied to the hopper 27 as mentioned above is dispersed into a lot of wrap off-cuts pieces N1 having various large and small sizes and shapes and is continuously dropped into the above of the half kneaded noodle skin raw material F within the hopper 27 as shown in FIG. 8 since a lot of punching holes N2 after die cutting are formed in a whole of the belt-like wrap off-cuts N. At the same time, the work that the half kneaded noodle skin raw material F is input to the above of the wrap off-cuts piece N1 is sequentially repeated. Therefore, the wrap off-cuts piece N1 is mixed with the half kneaded noodle skin raw material F in the process of being transferred to the front side from the rear side by the feeding conveyor 28.

Further, the hopper 27 is formed into a rectangular shape which is longer in a longitudinal direction (a rotating direction of the feeding conveyor 28) in a plan view, and is formed by a rectangular frame 27a which is open in a vertical direction, and a front side of the rectangular frame 27a is open and is communicated with the noodle belt forming unit 3 in the next step.

Figure 12:
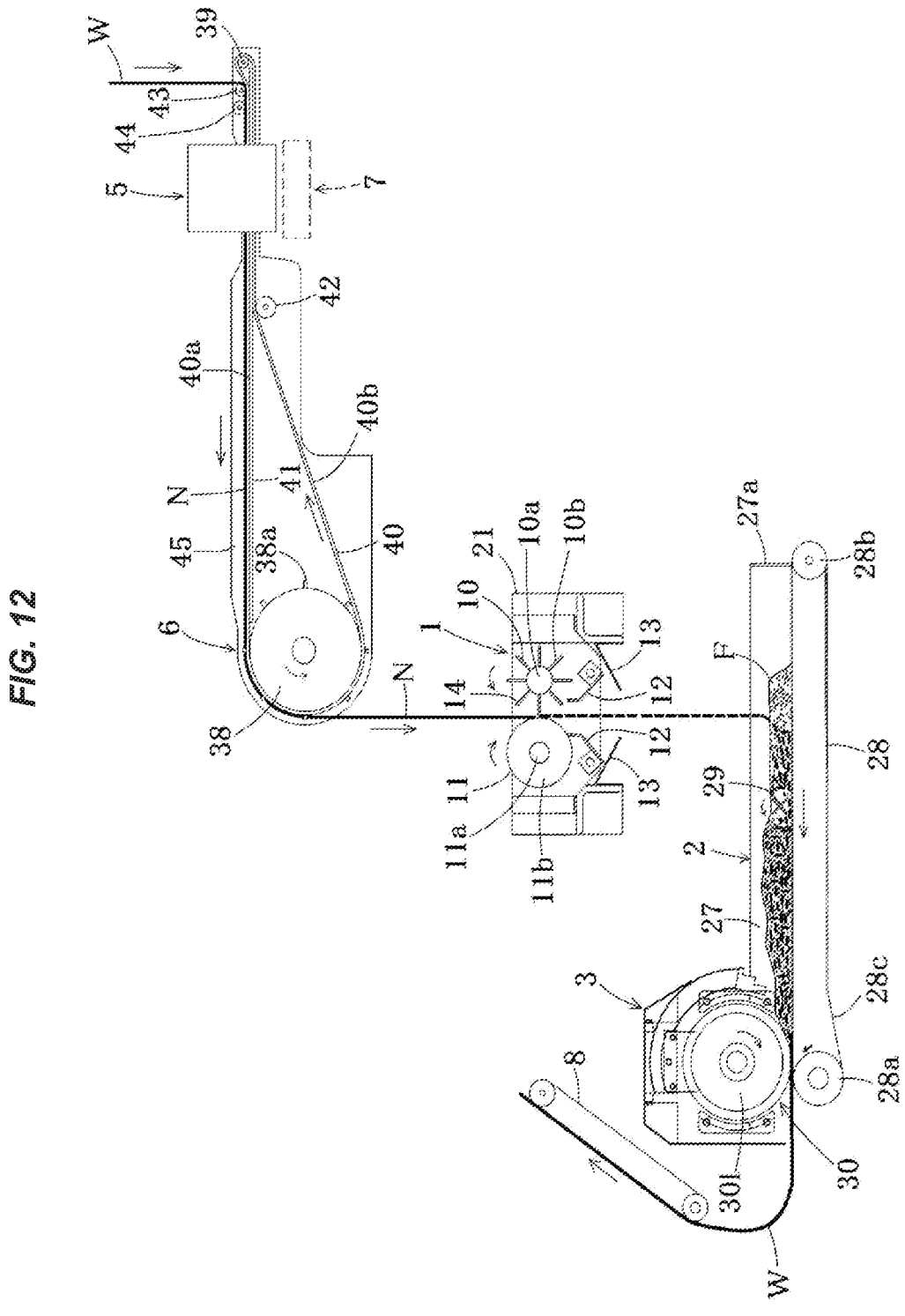
FIG. 12 is an explanatory view showing a used state of each of a feeding unit of a belt-like wrap off-cuts after being die cut, a cutting unit, a mixing and supply unit having an agitating mechanism of a wrap off-cuts piece and a half kneaded noodle skin raw material built-in, and a noodle belt forming unit using a pipe roller according to the other embodiment of the gyoza forming machine.

Further, as shown in FIG. 12, by the provision of an agitating mechanism 29 which is rotated by a drive unit (not shown) such as a motor for agitating the wrap off-cuts piece N1 and the half kneaded noodle skin raw material F approximately at the center position within the hopper 27, the wrap off-cuts piece N1 and the half kneaded noodle skin raw material F can be transferred to the next noodle belt forming unit 3 via an open portion in the front side within the hopper 27 (rectangular frame 27a) while being more uniformly mixed.

Figure 13:
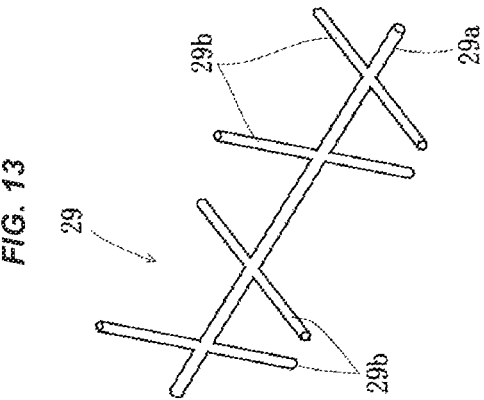
FIG. 13 is a perspective view of an agitating bar and shows an embodiment of the agitating mechanism.

The agitating mechanism 29 is formed, as shown in FIG. 13, by providing a plurality of agitating bars 29b in a protruding manner to form a cross shape in the front view, the agitating bars 29b being disposed at uniform intervals in a longitudinal direction on an outer periphery of a center shaft 29a having one end coupled to a drive unit (not shown) such as a motor in an interlocking manner and a set of the agitating bars 29b having two agitating bars shifted at 90 degree in a width direction. The agitating mechanism 29 may employ a tabular agitating blade and the other constructions as long as it has the same function, in addition to the agitating bar 29b.

The noodle belt forming unit 3 is arranged in the front side of the supply unit 2 as shown in FIGS. 1, 2, 3 and 9, and is configured to roll the mixed material of the half kneaded noodle skin raw material F supplied to the upper surface of the feeding conveyor 28 within the hopper 27 and the wrap off-cuts piece N1 of the belt-like wrap off-cuts N cut by the cutting unit 1 to form the new noodle belt W having the one-layer structure.

Figure 9:
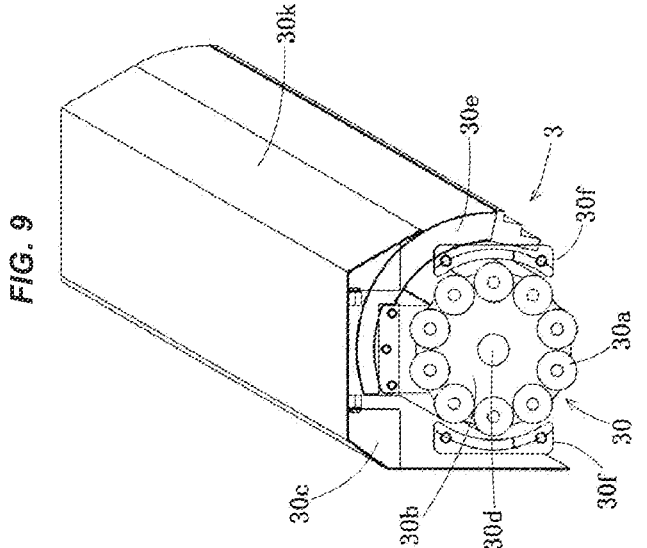
FIG. 9 is a perspective view showing a general structure of beat rollers of the noodle belt forming unit in the gyoza forming machine.

More specifically, the noodle belt forming unit 3 is provided with a rolling machine 30 in which a rotating disc 30*b* axially supporting a plurality of beat rollers 30*a* rotatably on the same circumference is fixed to a shaft 30*d* pivotally supported below a support frame 30*c*, as shown in detail in FIG. 9, and rolls the half kneaded noodle skin raw material F and the wrap off-cuts piece N1 mixed within the supply unit 2, with respect to the upper portion of the driving roller 28*a* in the front side of the feeding conveyor 28 in the lower side of the supply unit 2. Further, a stepped pressing plate 30*e* is axially supported to the rolling machine 30 to be swingable around the shaft 30*d* in front of a plurality of beat rollers 30*a*, and is configured to press the mixed material of the noodle skin raw material F and the wrap off-cuts piece N1 on the feeding conveyor 28 step by step with two stages of lower end surfaces before transmitting to the rolling machine 30. Reference sign 30*k* shown by a broken line in FIGS. 1 and 2 denotes a cover portion.

Further, in an inner side of the beat rollers 30*a*, two arc-shaped partition plates 30*f* and 30*f* are arranged in an opposing manner at front and rear positions so as to prevent the mixed material supplied and fed from the supply unit 2 by the feeding conveyor 28 from moving into the periphery of the beat rollers 30*a* and prevent a rotation trouble from being generated. In this state, the partition plate 30*f* in the rear side is positioned in the inner side of the pressing plate 30*e*.

Figure 10:
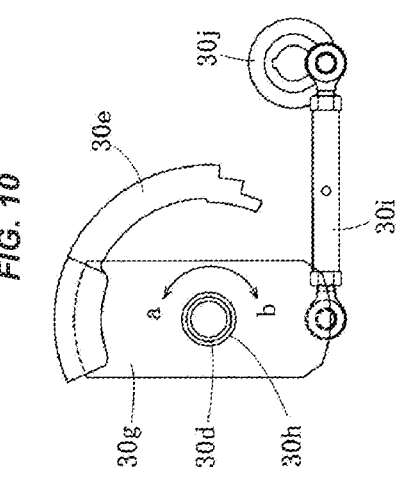
FIG. 10 is a front elevational view showing a pressing plate of the beat rollers of the noodle belt forming unit in the gyoza forming machine.

Further, an oscillation member 30*g* to which one end of the pressing plate 30*e* is fixed is axially supported to the shaft 30*d* so as to be swingable between a position a and a position b in the drawing via a bearing 30*h* together with the pressing plate 30*e*, as shown in FIG. 10. A crank arm 30*i* is rotatably coupled to the other end of the oscillation member 30*g*, and the other end of the crank arm 30*i* acts as a reciprocating mechanism, and is rotatably coupled, for example, to an eccentric portion of a crank disc 30*j*.

Figure 11:
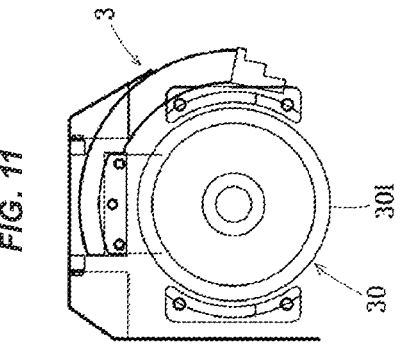
FIG. 11 is a front elevational view showing a general structure of a pipe roller corresponding to the other embodiment of the gyoza forming unit.

In the meantime, as shown in FIGS. 11 and 12, a pipe roller 301 can be used in place of the beat rollers 30*a*. A drive mechanism and the other portions of the pipe rollers 301 are the same as those of the beat rollers 30*a* and a description thereof will be accordingly omitted.

The rolling unit 4 is provided with a plurality of (three in the present embodiment) rolling means (31*a* to 31*c*) which expands the new noodle belt W via the feeding conveyor 8 after the mixed material of the half kneaded noodle skin raw material F and the wrap off-cuts piece N1 is compressed and the new noodle belt W having the one-layer structure is formed by the noodle belt forming unit 3.

More specifically, a pair of rollers (r1 and r2) are arranged in each of the rolling means (31*a* to 31*c*) while sequentially narrowing a distance between them, as shown in FIGS. 1 and 2. When the new noodle belt W passes between these pairs of rollers (r1 and r2), the new noodle belt W is sequentially compressed in a thickness direction, and the new noodle belt W having the same thickness as the gyoza skin M having the predetermined thickness can be finally obtained.

Further, the feeding conveyor 9 is arranged below the final pair of rollers (r1 and r2) in the rolling means (31*a* to 31*c*), and a guide roll 32 is arranged just below between both the rollers (r1 and r2) and in the upper portion of the feeding conveyor 9, the guide roll 32 feeding the new noodle belt W falling down between the final pair of rollers (r1 and r2) in a direction of a leading end of the feeding conveyor 9 while bending into an approximately L-shaped form in the front view.

The new noodle belt W moving on the feeding conveyor 9 is suspended downward at the leading end of the feeding conveyor 9 and is transferred to the die cutting unit 5 and the feeding unit 6 in the next step.

The die cutting unit 5 is provided for die cutting the new noodle belt W introduced from the rear end side of the feeding unit 6 via the noodle belt forming unit 3, the feeding conveyor 8, the rolling unit 4 and the feeding conveyor 9 into a predetermined shape (for example, a circular shape or an oval shape) and obtaining the belt-like wrap off-cuts N having a lot of punching holes N2 and the gyoza skin M.

More specifically, the die cutting unit 5 is provided with a lower open box-shaped cover 33 which is coated from the above in the vicinity of the rear side of the feeding unit 6, a base plate 34 which is horizontally fixed to an approximately center portion within the cover 33, two cylinders 35 and 35 which are arranged in both sides of an upper portion of the base plate 34, and two punching dies 36 and 36 which are coupled and fixed to lower ends of drive shafts 35*a* and 35*a* of both the cylinders 35 and 35.

An upper surface of the base plate 34 is formed into a flat shape in such a manner that the cylinders 35 and 35 are vertically fixed thereto, and a lower surface of the base plate 34 is formed in such a manner that two punching dies 36 and 36 are accommodated and the same shape and number of concave portions 37 are open downward. Further, the punching dies 36 and 36 is configured to ascend and descend while peripherally contacting with inner walls of the concave portions 37 and 37 on the basis of upward and downward motions of the drive shafts 35*a* and 35*a* of the cylinders 35 and 35.

Figures 14A, 14B:
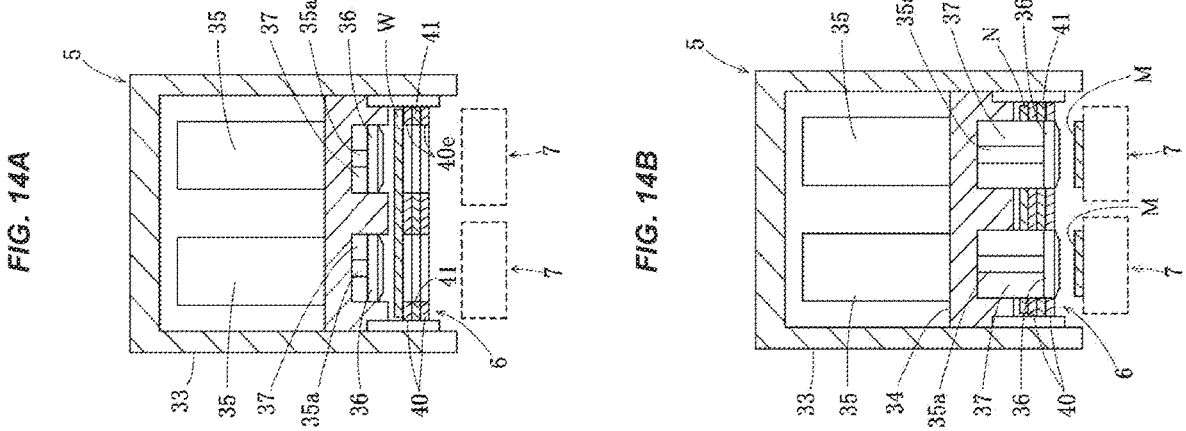

In the meantime, below the cover 33, the new noodle belt W is put on the feeding unit 6, and a pair of two gyoza forming machines 7 and 7 are on standby, as shown in FIG. 14A.

At this time, the feeding unit 6 is in a state in which respective holes of an upper belt of a feeding conveyor, a support plate in an intermediate portion and a lower belt are communicated (this state will be mentioned later).

As shown in FIG. 14B, the punching dies 36 and 36 pass through the respective holes in association with the downward motion of the drive shafts 35*a* and 35*a* of the cylinders 35 and 35 and die cut the gyoza skin M from the new noodle belt W. As a result, the belt-like wrap off-cuts N is transferred to the front side of the feeding unit 6, and the gyoza skin M falls down on the upper surfaces of the gyoza forming machines 7 and 7 under being on standby and is put thereon.

In the present embodiment, the ascending and descending motion of the punching dies 36 and 36 is performed by two cylinders 35 and 35, however, is not limited to this, but may of course utilize the other drive mechanism.

Figure 4:
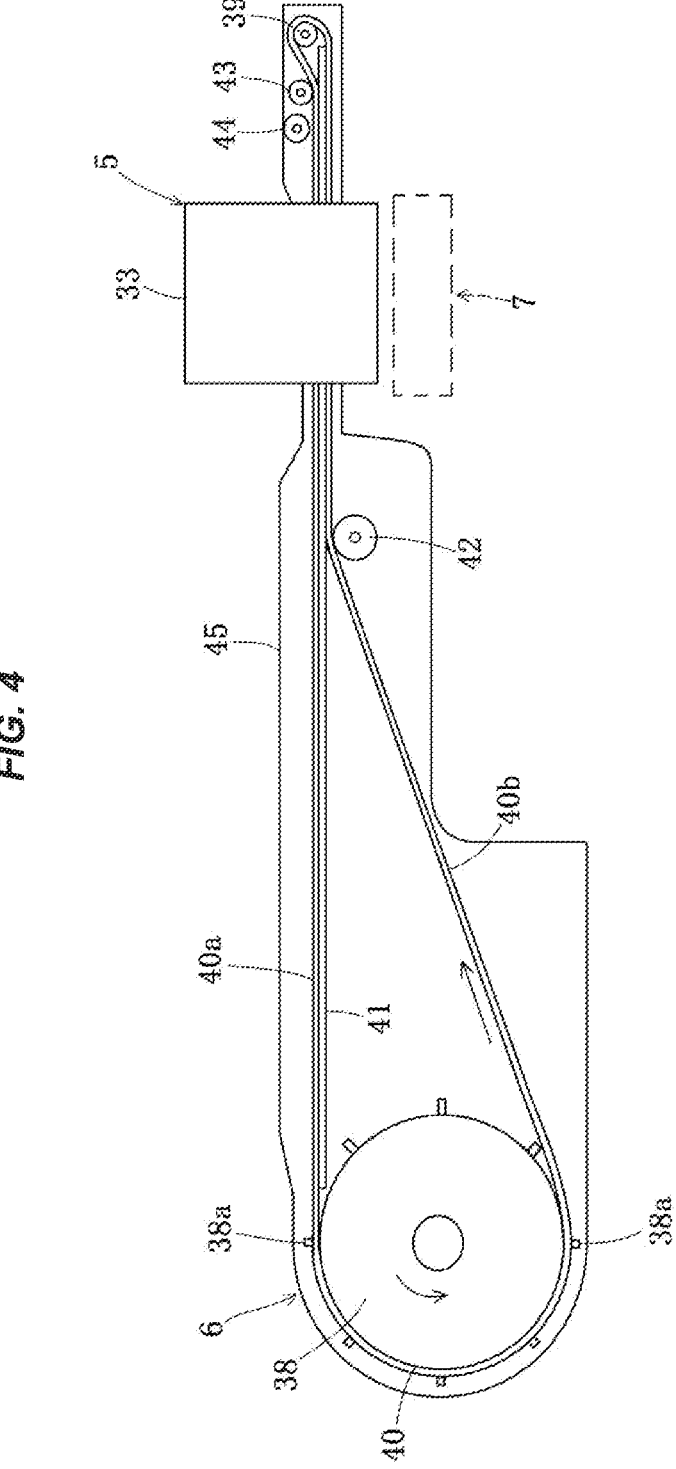
FIG. 4 is an enlarged front elevational view of the feeding unit (in a state in which a front face side support frame is detached) of the belt-like wrap off-cuts after being die cut in the gyoza forming machine.
Figure 5:
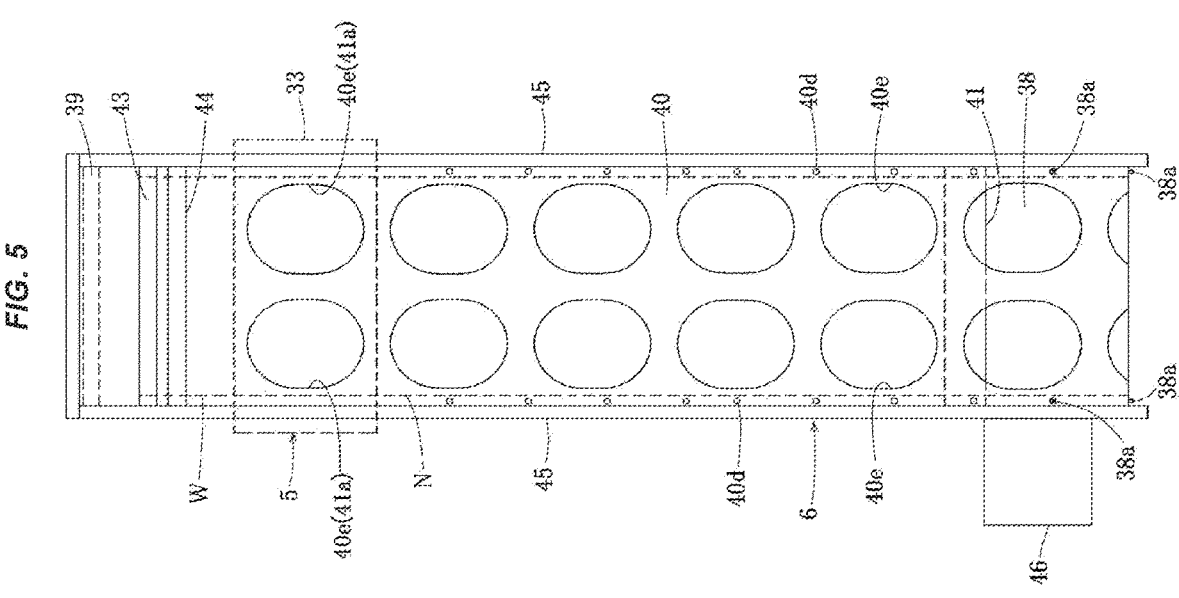
FIG. 5 is a plan view of the feeding unit.

The feeding unit 6 is provided as major parts a large-diameter driving roller 38 which is arranged at a front position, a small-diameter driven roller 39 which is arranged at a rear position, an endless conveyor belt 40 which is wound between both the rollers 38 and 39, a support plate 41 which is arranged along a lower surface of an upper horizontal portion 40*a* of the conveyor belt 40, a rotatable small-diameter lifting roller 42 which is arranged slightly at a rear side of the center of the conveyor belt 40 in such a manner as to bring a lower inclined portion 40*b* of the conveyor belt 40 into contact or close contact with a lower surface of the support plate 41, a rotatable small-diameter pressing roller 43 which is arranged in such a manner as to bring the conveyor belt 40 into contact or close contact with an upper surface of the support plate 41 in an upper side in front of the driven roller 39, a guide roller 44 which guides the new noodle belt W rotatably arranged in the vicinity in front of the pressing roller 43 to the upper surface of the upper horizontal portion 40*a* of the conveyor belt 40 while bending the new noodle belt W in a perpendicular direction from the above, support frames 45 and 45 which are arranged in an opposing manner in both sides of the conveyor belt 40 and the support plate 41 while axially supporting each of the rollers 38, 39, 42, 43 and 44 leading to the driven roller 39 from the driving roller 38, and a drive unit 46 such as a motor which is arranged on an outer surface of the one support frame 45 in such a manner as to intermittently rotate the driving roller 38 in a direction of an arrow (a counterclockwise direction), as shown in FIGS. 4, 5 and 8.

Further, a plurality of (eight in the present embodiment) locking projections 38*a* are provided in a protruding manner at uniform intervals on outer peripheries of both ends of the driving roller 38, and a plurality of locking holes 40*d* locked to the respective locking projections 38*a* of the driving roller 38 are pierced at uniform intervals in both sides of the endless conveyor belt 40.

In association with the rotation of the driving roller 38 in the direction of the arrow in the drawing (the counterclockwise direction) by the drive unit 46 as mentioned above, the locking projections 38*a* in both ends of the driving roller 38 are engaged with the locking holes 40*d* in both ends of the endless conveyor belt 40 one by one. As a result, the conveyor belt 40 is also rotated in the same direction, that is, the direction of the arrow in the drawing (the counterclockwise direction).

Further, in the endless conveyor belt 40, a plurality of die cutting holes 40*e* for the gyoza skin M are opened over two lines and at uniform intervals in both sides and in a longitudinal direction. It goes without saying that the die cutting holes 40*e* may be disposed in one line. By the way, the die cutting hole 40*e* of the conveyor belt 40 and the through hole 41*a* of the support plate 41 have the same shape and same size as those of each of the punching holes N2 of the belt-like wrap off-cuts N.

In the meantime, the die cutting unit 5 is arranged as already mentioned in the rear side of the feeding unit 6, as shown in FIGS. 4 and 14. However, the upper horizontal portion 40*a* and the lower horizontal portion 40*c* of the endless conveyor belt 40 constructing the feeding unit 6, and the support plate 41 are arranged in the lower side of the inner portion of the cover 33 of the die cutting unit 5 so that they are overlapped.

Further, the through hole 41*a* is open to the support plate 41, the through hole 41*a* having the same shape and same size as those of an inner side of the concave portions 37 and 37 provided in the lower surface of the base plate 34, that is, an outer shape of the punching die 36 and 36 ascended and descended by the cylinders 35 and 35 and an inner shape of the die cutting hole 40*e* of the conveyor belt 40. When the conveyor belt 40 intermittently rotated by the driving roller 38 stops, both the die cutting holes 40*e* and 40*e* of the upper horizontal portion 40*a* and the lower horizontal portion 40*c* are consistent with the through hole 41*a*.

In the new noodle belt W which is guided by the guide roller 44 and put on the rear upper surface of the upper horizontal portion 40*a* of the conveyor belt 40, the gyoza skins M and M is supplied while dropping to the gyoza forming machines 7 and 7 which are positioned below, the gyoza skins M and M being die cut by the punching dies 36 and 36 sequentially passing through the punching holes 40*e* and 40*e* in the upper portion of the conveyor belt 40, the through hole 41*a* of the support plate 41 and the punching holes 40*e* and 40*e* in the lower portion of the conveyor belt 40 to fall down in association with the rotation stop of the conveyor belt 40.

On the contrary, the belt-like wrap off-cuts N after being die cut is transferred to the upper surface of the driving roller 38 in the front side via the upper horizontal portion 40*a* of the conveyor belt 40 while being supported by the support plate 41 in association with the return rotation of the conveyor belt 40, is suspended from the leading end of the driving roller 38, and comes to the wrap off-cuts piece N1 cut by the cutting unit 1 to be supplied while dropping to the rear side of the upper surface of the feeding conveyor 28 within the hopper 27 in the supply unit 2.

Figures 15A, 15B, 15C:
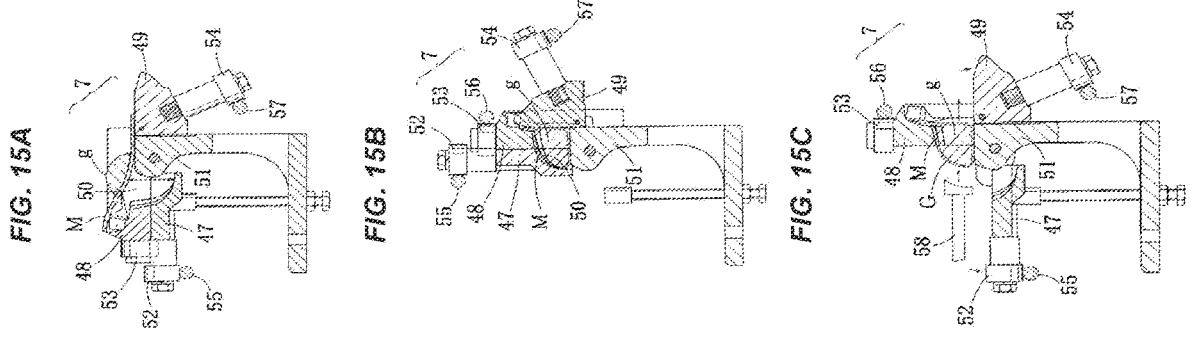

The gyoza forming machine 7 making the gyoza G using the gyoza skin M die cut by the die cutting unit 5 is provided as major members a receiving die 47, an intermediate die 48, a pressing die 49, a gyoza forming concave portion 50 and a base plate 51 as shown in FIG. 15A. The gyoza forming concave portion 50 is formed on the base plate 51 by the receiving die 47, the intermediate die 48 and the pressing die 49.

Further, the receiving die 47, the intermediate die 48 and the pressing die 49 are set to an open state, the gyoza skin M is put on the upper surfaces of the intermediate die including the forming concave portion 50 and the base plate 51 and the pressing die 49 via the die cutting unit 5, and thereafter the filling g is filled in the approximately center portion of the gyoza skin M by a hopper H for the filling in the gyoza forming machine P.

Next, as shown in FIG. 15B, the receiving die 47, the intermediate die 48 and the pressing die 49 are set to a closed state by sliding each of die opening guides 52, 53 and 54 along guide rails 55, 56 and 57, the gyoza skin M is folded in half in a state in which the filling g is internally included, and the gyoza G is formed within the forming concave portion 50.

Finally, as shown in FIG. 15C, only the receiving die 47 and the pressing die 49 except the intermediate die 48 are opened to an original position, and the gyoza G housed within the forming concave portion 50 of the intermediate die 48 is pushed forward by a pressing tool 58. The gyoza G pressed out as mentioned above is slid on a flat receiving surface of the pressing die 49 and is discharged to a discharge table or a discharge conveyor.

In FIGS. 1 and 2, reference symbol L denotes a control panel for the various mechanisms.

The invention claimed is:

1. A wrap off-cuts cutting and returning apparatus in a gyoza forming machine for compressing a half kneaded noodle skin raw material to form into a belt-like shape, die cutting the obtained belt-like material into a predetermined shape to form a gyoza skin, putting a gyoza filling on the gyoza skin, and wrapping the gyoza filling with the gyoza skin to obtain a gyoza, wherein the wrap off-cuts cutting and returning apparatus comprises:

a cutting unit which sequentially cuts a belt-like wrap off-cuts after being die cut into a wrap off-cuts piece having a predetermined length via a feeding unit thereof, a supply unit for the half kneaded noodle skin raw material to which the wrap off-cuts piece cut by the cutting unit is continuously supplied while dropping, and a noodle belt forming unit which compresses the wrap off-cuts piece and the noodle skin raw material mixed within the supply unit to form a one-layer new noodle belt, wherein the gyoza forming machine is configured to return the wrap off-cuts piece obtained by cutting the die cut belt-like wrap off-cuts of the new noodle belt formed by the noodle belt forming unit by the cutting unit to the supply unit for the half kneaded noodle skin raw material, wherein the cutting unit for the belt-like wrap off-cuts includes a rotary blade and a rotating roller which are arranged in an opposing manner so as to cut across the vertically dropping belt-like wrap off-cuts at intervals in a vertical direction while holding the vertically dropping belt-like wrap off-cuts from both surfaces, and wherein a scraper is arranged below the rotary blade and the rotating roller, the scraper scraping off noodle dregs which are attached to a leading end of a plate blade in the rotary blade and an outer periphery surface of the rotating roller.

2. A wrap off-cuts cutting and returning apparatus in a gyoza forming machine for compressing a half kneaded noodle skin raw material to form into a belt-like shape, die cutting the obtained belt-like material into a predetermined shape to form a gyoza skin, putting a gyoza filling on the gyoza skin, and wrapping the gyoza filling with the gyoza skin to obtain a gyoza, wherein the wrap off-cuts cutting and returning apparatus comprises:

a cutting unit which sequentially cuts a belt-like wrap off-cuts after being die cut into a wrap off-cuts piece having a predetermined length via a feeding unit thereof, a supply unit for the half kneaded noodle skin raw material to which the wrap off-cuts piece cut by the cutting unit is continuously supplied while dropping, and a noodle belt forming unit which compresses the wrap off-cuts piece and the noodle skin raw material mixed within the supply unit to form a one-layer new noodle belt, and wherein the gyoza forming machine is configured to return the wrap off-cuts piece obtained by cutting the die cut belt-like wrap off-cuts of the new noodle belt formed by the noodle belt forming unit by the cutting unit to the supply unit for the half kneaded noodle skin raw material, wherein the gyoza forming machine is configured to return the wrap off-cuts piece obtained by cutting the die cut belt-like wrap off-cuts of the new noodle belt formed by the noodle belt forming unit by the cutting unit to the supply unit for the half kneaded noodle skin raw material, and wherein the feeding unit includes a driving roller which is arranged at a front position, a driven roller which is arranged at a rear position, an endless conveyor belt which is wound between both the rollers, a support plate which is arranged along a lower surface of an upper horizontal portion of the conveyor belt, and a pressing roller and a lifting roller which bring the upper horizontal portion and a lower horizontal portion of the conveyor belt into contact with or nearly in contact with both upper and lower surfaces of the support plate near a rear side of the conveyor belt.

3. The wrap off-cuts cutting and returning apparatus in the gyoza forming machine according to claim 2, wherein a plurality of die cutting holes for the gyoza skin are open to the endless conveyor belt at uniform intervals.

4. The wrap off-cuts cutting and returning apparatus in the gyoza forming machine according to claim 2, wherein through holes for the gyoza skin having a same shape and a same size as a shape and size of the die cutting holes in the conveyor belt are open to the support plate in the die cutting unit at the rear of the support plate.

5. The wrap off-cuts cutting and returning apparatus in the gyoza forming machine according to claim 2, wherein a plurality of locking projections are provided in a protruding manner at uniform intervals on outer peripheries of both ends of the driving roller, and a plurality of locking holes locked to the locking projections are pierced at uniform intervals in both sides of the endless conveyor belt, so that the conveyor belt is rotated in a same direction as the driving roller.

6. The wrap off-cuts cutting and returning apparatus in the gyoza forming machine according to claim 4, wherein the die cutting unit includes a cover which is covered from above in the vicinity of a rear side of the feeding unit and is open in a lower end thereof, a base plate which is fixed to an approximately center portion in the cover, and a punching die which is arranged below the base plate so as to be movable up and down.

7. The wrap off-cuts cutting and returning apparatus in the gyoza forming machine according to claim 6, wherein the punching die is configured to transfer the belt-like wrap off-cuts to a front side of the feeding unit, a plurality of punching holes are formed on the belt-like wrap off-cuts at uniform intervals, the plurality of punching holes are obtained by die cutting the new noodle belt mounted on the upper surface of the conveyor belt while sequentially inserting the punching die into and extracting the punching die from the through holes in the support plate of the feeding unit and the die cutting holes passing through both the upper and lower surfaces of the conveyor belt in the cover.

8. The wrap off-cuts cutting and returning apparatus in the gyoza forming machine according to claim 6, wherein the punching die is configured to transfer the gyoza skin to the gyoza forming machine waiting below the die cutting unit, the gyoza skin being obtained by die cutting the new noodle belt mounted on the upper surface of the conveyor belt while sequentially inserting the punching die into and extracting the punching die from the through holes in the support plate of the feeding unit and the die cutting holes passing through both the upper and lower surfaces of the conveyor belt in the cover.

* * * * *